United States Patent Office 3,833,544
Patented Sept. 3, 1974

3,833,544
METHOD FOR MAKING POLYETHERIMIDES
Tohru Takekoshi and Jeannette S. Manello, Scotia, N.Y., assignors to General Electric Company
No Drawing. Filed June 22, 1973, Ser. No. 372,742
Int. Cl. C08g 20/32
U.S. Cl. 260—47 CB    10 Claims

ABSTRACT OF THE DISCLOSURE

A method for making polyetherimides is provided involving the reaction of aromatic bis(ether anhydride)s and organic diisocyanates in the presence of an alkali carbonate catalyst. Polymerization can be effected under melt conditions, or at elevated temperatures using a nonpolar solvent. The polyetherimides can be injection molded to useful shapes.

The present invention relates to a method for making polyetherimide involving the use of an alkali carbonate to catalyze the reaction between aromatic bis(ether anhydride) and organic diisocyanate.

The polyetherimides which can be made in the practice of the invention consist essentially of chemically combined units of the formula, (I)
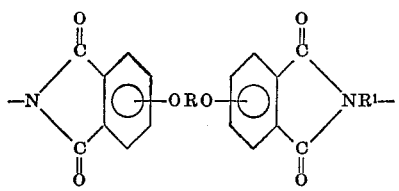

where R is a divalent aromatic organic radical having from 6–30 carbon atoms, $R^1$ is a divalent organic radical selected from R radicals, alkylene radicals having from 2–20 carbon atoms, cycloalkylene radicals, and $C_{(2-8)}$ alkylene terminated polydiorganosiloxane radicals.

Radicals included by R are, for example, aromatic hydrocarbon radicals and halogenated aromatic hydrocarbon radicals, for example, phenylene, tolylene, chlorophenylene, naphthalene, etc., and radicals included by the formula, $$-R^2-(Q)_a-R^2-,$$

where $R^2$ is a divalent aromatic radical having from 6–13 carbon atoms selected from hydrocarbon radicals and halogenated hydrocarbon radicals, and Q is a divalent organo radical selected from

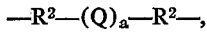

where $a$ is 0 or 1, $y$ is an integer having a value of from 1–5 inclusive, and $R^3$ is a monovalent hydrocarbon radical selected from methyl, phenyl, etc.

Radicals included by $R^1$ are, for example,

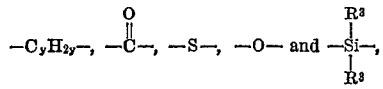

etc.; alkylene radicals such as hexamethylene, etc., cyclohexylene, etc.

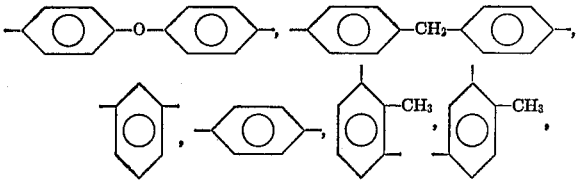

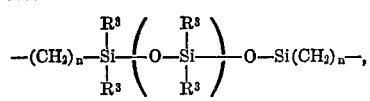

where $R^3$ is as defined above, m is equal to 0 to 100 inclusive, and n is 2–8 inclusive.

One method for making polyimides from organic dianhydrides and organic diisocyanates requires the employment of dipolar aprotic solvent such as dimethylformamide, N-methylpyrrolidone, dimethyl sulfoxide, etc. Another method for making polyimides using organic dianhydrides and organic diisocyanates which does not require the use of expensive dipolar aprotic solvents is based on the employment of certain catalysts such as Lewis acid catalysts, tertiary amines, phosphines, etc. It has been found that the use of such catalysts is not effective for making high molecular weight polyimide. Attempts to form high molecular weight polyimide at elevated temperatures often cause undesirable decomposition of polymer. It is also known that basic catalysts, such as amines and phosphines catalyze trimerization of isocyanate resulting in cross-linked polymer.

The present invention is based on the discovery that effective amounts of a heterogeneous catalyst, such as an alkali carbonate, and preferably potassium carbonate has been found to be a very efficient and specific catalyst for the production of polyetherimides of formula I. Surprisingly, intercondensation between aromatic bis(ether anhydride) of the formula, (II)
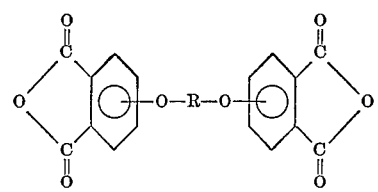

and organic diisocyanate of the formula (III)    $OCNR^1NCO$ can be effected under melt conditions at temperatures as high as 350° C., or in the presence of a non-polar organic solvent under reflux conditions in a comparatively short period of time such as six hours or less. Under such conditions the catalysts of the prior art were found to be ineffective for making linear high molecular weight polymers. In addition, reaction times of as long as 24 hours or more were not unusual.

There is provided by the present invention a method for making polyetherimide of formula I which comprises (1) Agitating a polymerization mixture of substantially equal molar amounts of aromatic bis(ether anhydride) of formula II and organic diisocyanate of formula III in the presence of an effective amount of an alkali carbonate and a temperature of at least 150° C., and (2) Recovering the polyetherimide from the mixture of (1).

Included by the aromatic bis(ether anhydride) of formula II are anhydrides of the formulas, (IV)
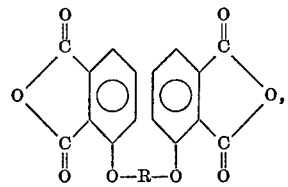

(V)
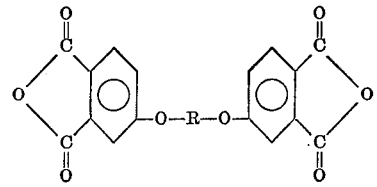

(VI) 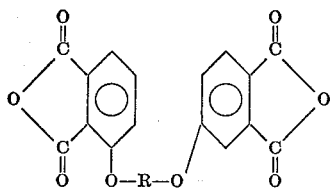

where R is defined above. A preferred form of R is

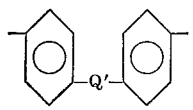

where Q' is selected from

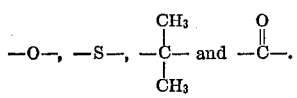

Dianhydrides included by formula IV are, for example, 2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride, etc.

Dianhydrides included by formulas V and VI are, for example, 2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy) diphenyl-2,2-propane dianhydride, etc.

In addition to formulas IV–VI above, aromatic bis(ether anhydride)s also included by formula I are shown by Koton, M. M.; Florinski, F. S.; Bessonov, M. I.; Rudakov, A. P. (Institute of Heteroorganic Compounds, Academy of Sciences, U.S.S.R.) U.S.S.R. 257,010, Nov. 11, 1969, Appl. May 3, 1967. In addition dianhydrides shown M. M. Koton, F. S. Florinski, Zh Org. Khin, 4(5), 774 (1968).

Some of the aromatic bis(ether anhydride)s of formula I are shown in copending application of Darrell Heath and Joseph Wirth, Ser. No. 281,749, filed Aug. 18, 1972, and assigned to the same assignee as the present invention. These dianhydrides can be prepared from the hydrolysis, followed by dehydration of the reaction product of a nitro-substituted phenyl dinitrile with a metal salt of a dihydric phenol compound in the presence of a dipolar aprotic solvent. For example, a benzenoid compound of the formula,

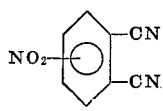

where the $NO_2$ group can be positioned anywhere in the benzene ring, can be reacted in dimethylformamide with an alkali metal salt of a dihydric phenol of the general formula,

where $R^2$ is a divalent aromatic radical and Alk is an alkali metal ion. Various well known procedures can be used to convert the resulting tetranitriles to the corresponding tetra-acids and dianhydrides.

Included by the alkali metal salts of the above described dihydric phenols are sodium and potassium salts of the following dihydric phenols, 2,2-bis(2-hydroxyphenyl)propane;
2,4'-dihydroxydiphenylmethane;
bis(2-hydroxyphenyl)methane;
2,2-bis(4-hydroxyphenyl)propane hereinafter identified as "bisphenol-A" or "BPA";
1,1-bis(4-hydroxyphenyl)ethane;
1,1-bis(4-hydroxyphenyl)propane;
2,2-bis(4-hydroxyphenyl)pentane;
3,3-bis(4-hydroxyphenyl)pentane;
4,4'-dihydroxybiphenyl;
4,4'-dihydroxy-3,3'-dimethylbiphenyl;
4,4'-dihydroxybenzophenone;
4,4'-dihydroxydiphenyl sulfoxide;
4,4'-dihydroxydiphenyl sulfide; etc.

Included by the organic diisocyanates of formula III are diphenyl ether-4,4'-diisocyanate;
diphenylmethane-2,4'-diisocyanate;
diphenylmethane-4,4'-diisocyanate;
toluene-2,4-diisocyanate;
toluene-2,6-diisocyanate;
hexane-1,6-diisocyanate;
m-phenylene diisocyanate; etc.

In the practice of the invention, polyetherimide can be made by either melt or solution polymerization of a mixture of the aromatic bis(ether anhydride) or "dianhydride" and the organic diisocyanate or "diisocyanate" under an inert atmosphere such as nitrogen in the presence of an effective amount of alkali carbonate.

Substantially equal moles of dianhydride and diisocyanate can be employed to provide polyetherimide of intrinsic viscosities in dimethylformamide up to 1.2. During polymerization, a high degree of agitation must be maintained, such as by stirring, inert gas purge, etc. in order to facilitate the evolution of carbon dioxide.

The order of addition of the reactants and alkali carbonate catalyst is not critical. It has been found expedient to either add the catalyst to a heated mixture of the anhydride and diisocyanate, or heat the total combination of ingredients to reaction temperature. The alkali carbonate can include sodium carbonate, rubidium carbonate, cesium carbonate, etc. in addition to potassium carbonate. An effective, or catalytic amount of alkali carbonate can be 0.01% to 1% by weight based on the weight of mixture and preferably 0.02% to 0.1%.

Polymerization can be conducted in the presence of an inert non-polar solvent under substantially anhydrous conditions at a temperature of from 160° C. to 300° C., and preferably 200° C. to 250° C. Suitable inert non-polar solvents are any non-polar organic solvents or mixtures of organic solvents inert to the reactants which boil between 100° C. to 300° C. Included among such solvents are toluene, ethylbenzene, xylenes, chlorobenzene, dichlorobenzenes, trichlorobenzenes, diphenyl ether, benzophenone, benzonitrile, biphenyl, chlorinated biphenyls, anisole, phenetole, nitrobenzene, tetrachloroethylene, diphenyl sulfide, etc.

In instances where polymerization is effected under melt conditions a temperature of from 160° C. to 350° C. can be used and preferably from 200° C. to 300° C. The temperature of the melt is maintained above the glass transition temperature of the resulting polyetherimide but below a temperature of about 350° C. Preferably, the melt polymerization is conducted at a temperature of between about 200° C. to 300° C. The course of the reaction can be readily followed by the change in melt viscosity of the mixture.

Recovery of polyetherimide at the termination of polymerization can be effected by filtering a solution of the polymer to effect separation of insoluble catalyst. In instances where filtration is effected with polymer made by melt polymerization, a solution of the polymer can be made with organic solvents such as dimethylformamide, methylene chloride, N-methylpyrrolidone, dimethylsulfoxide, etc. The same technique also can be used with polymer made by solution polymerization. After filtration the polymer can be precipitated in water or methanol and dried under vacuum.

Polyetherimide having from 2 to 500 and preferably 10 to 100 average repeating units can be formed. These polymers can be blended with various fillers such as silica fillers, glass fibers, carbon whiskers, perlite, etc. The resulting filled compositions can have a proportion of from about 1 part to 70 parts of filler per hundred parts of polyetherimide. The blending of the filler with the polyetherimide can be achieved by adding the filler prior to forming the melt or directly to the melt. Stirring can be effected with a standard agitating means to facilitate blending the ingredients.

In order that those skilled in the art will be better able to practice the invention, the following examples are given by way of illustration and not by way of limitation. All parts are by weight.

EXAMPLE 1

A mixture of 1.552 parts of diphenylmethane-4,4'-diisocyanate, 3.227 parts of 2,2 - bis[4 - (3,4 - dicarboxyphenoxy)phenyl]propane dianhydride, and 0.002 part of finely pulverized potassium carbonate was heated at 220–230° C. for 15 minutes under nitrogen atmosphere. The mixture formed a melt and a vigorous evolution of carbon dioxide was observed. The melt was further heated at 260° C. for 30 minutes and then allowed to cool to room temperature. The product was dissolved in about 70 parts of dimethylformamide. A solution resulted which was filtered to effect the removal of a small amount of insolubles. The solution was then poured in water and a product precipitated. The product was washed with water and dried at 100° C. under vacuum. There was obtained a 96.9% yield. Based on method of preparation the product was a polyetherimide consisting essentially of the following repeating unit

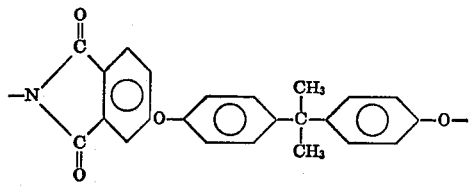

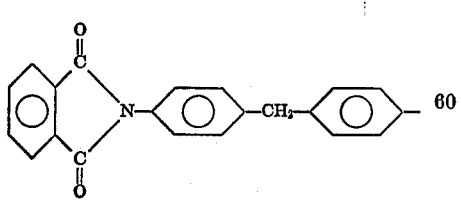

The above product had an intrinsic viscosity in DMF of 0.53 dl./g. The above procedure was repeated except that the potassium carbonate was omitted. After two hours of heating at 220–230° C., it was observed little or no action occurred and that the viscosity of the mixture did not increase.

EXAMPLE 2

A mixture of 0.0005 part of potassium carbonate, 1.2007 parts of an (80:20) mixture of 2,4- and 2,6-toluene diisocyanate and 3.6234 parts of 2,2-bis[4-(2,3 - dicarboxyphenoxy)phenyl]propane dianhydride was heated under a nitrogen atmosphere at 235–243° C. for 35 minutes. During the period of heating a vigorous evolution of carbon dioxide was observed. The temperature of the mixture was gradually raised to 273° C. over a period of 50 minutes. There was obtained an amber colored glassy product which was dissolved in dimethylformamide. The solution of the product was filtered and then poured into methanol. There was obtained a precipitate which was dried under vacuum at 100° C. A 99% yield of product was obtained having an intrinsic viscosity of 0.30 dl./g. in dimethylformamide. Based on method of preparation the product was a polyetherimide consisting essentially of repeating units of the formula

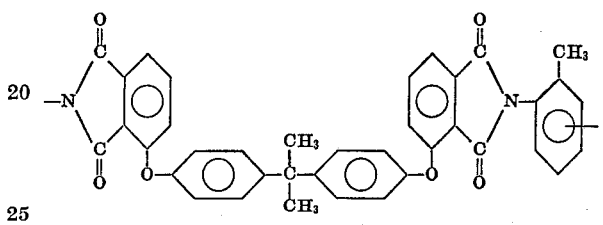

The above procedure was repeated except that the potassium carbonate catalyst was omitted. Although the same temperature was employed as utilized above, no significant reaction was observed after two hours.

EXAMPLE 3

A mixture of 0.0005 part of potassium carbonate, 1.3565 parts of an (80:20) mixture of 2,4- and 2,6-toluene diisocyanate, and 4.0941 parts of 2,2 - bis[4-(3,4 - dicarboxyphenoxy)phenyl]propane dianhydride was heated for 1¼ hours at 270–275° C. under a nitrogen atmosphere. A vigorous reaction occurred. Agitation was achieved with an inert gas purge. There was obtained at 91.6% yield of product which was worked up as previously described. The product had an intrinsic viscosity in DMF of 0.27 dl./g. at 25° C. The glass transition temperature was 228°. Based on method of preparation the product was a polyetherimide consisting essentially of repeating units of the formula

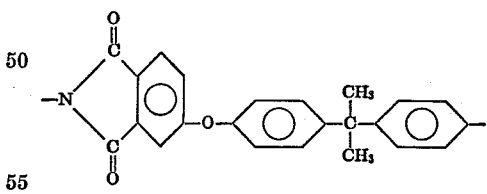

The above procedure was repeated except that potassium carbonate was omitted from the mixture. There was no reaction observed after 1¼ hours under a nitrogen atmosphere at a temperature of about 270–275° C.

EXAMPLE 4

A mixture of 2.872 parts of an (80:20) mixture of 2,4- and 2,6-toluene diisocyanate, 8.669 parts of 2,2-bis[4- (3,4 - dicarboxyphenoxy)phenyl]propane, 30 parts of ortho-dichlorobenzene and 0.001 part of potassium carbonate was stirred and heated at 180° under nitrogen for six hours. The resulting viscous reaction mixture was cooled, diluted with 60 parts of chloroform and poured into methanol. White fibrous polymer precipitate was collected and dried under vacuum at 150°. The yield of the polymer was 93.3% and the intrinsic viscosity of the polymer was 0.50 dl./g. in dimethylformamide. Based on the method of preparation, the product was a polyetherimide of which average chemical structure was identical with the product in Example 3.

The above polymerization was repeated except the potassium carbonate catalyst was omitted. After a reaction time of 10 hours at the same temperature, the viscosity of the reaction mixture did not increase significantly.

EXAMPLE 5

A mixture of 1.745 parts of an (80:20) mixture of 2,4- and 2,6-toluene diisocyanate, 5.166 parts of 4,4'-bis(3,4 - dicarboxyphenoxy)diphenyl sulfide dianhydride, and 20 ml. of trichlorobenzene was stirred and heated at 205° for one hour, during which time no reaction took place.

To the above reaction mixture, 0.02 part of rubidium carbonate was added. Carbon dioxide began to evolve from the surface of the rubidium carbonate. The reaction mixture was stirred for an additional 6 hours. On cooling, the polymer precipitated from the mixture. About 60 ml. of chloroform was added and the resulting solution was filtered to remove the catalyst. The filtrate was poured into methanol; the light yellow fibrous polymer was collected and dried at 150° C. under vacuum. The yield of the polymer was 5.68 parts (95.0%). The intrinsic viscosity of the product was 0.33 dl./g. in chloroform. Based on the method of preparation, the product was a polyetherimide having the following repeating unit

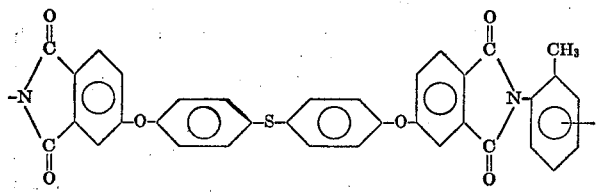

The above examples represent only a few of the very many polyetherimides which can be made in accordance with the practice of the present invention. It should be understood that the method of the invention is broadly directed to a method of making polyetherimide by intercondensing dianhydride of formula II and organic diisocyanate of formula III in the presence of an alkali carbonate catalyst.

What we claim as new and desire to secure by Letters Patent of the United States is:

1. A method for making polyetherimide of the formula

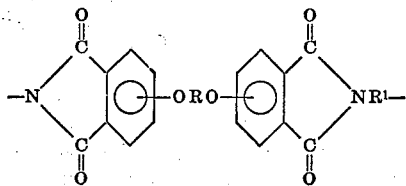

which comprises
(1) agitating a polymerization mixture of substantially equal molar amounts of aromatic bis(ether anhydride) of the formula

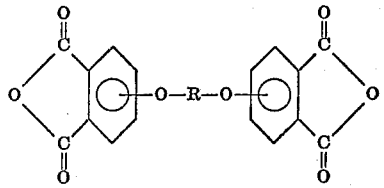

and organic diisocyanate of the formula

OCNR¹NCO

in the presence of an effective amount of an alkali carbonate and a temperature of at least 160° C.
(2) recovering the polyetherimide from the mixture of (1), where R is a divalent aromatic organic radical having from 6–30 carbon atoms, $R^1$ is a divalent organic radical selected from R radicals, alkylene radicals having from 2–20 carbon atoms, cycloalkylene radicals, and $C_{(2-8)}$ alkylene terminated polydiorganosiloxane radicals.

2. A method in accordance with claim 1 where polymerization is effected under melt conditinos at a temperature of from 160° C. to 350° C.

3. A method in accordance with claim 1 where polymerization is effected in the presence of a non-polar organic solvent at a temperature of at least 160° C.

4. A method in accordance with claim 1 where the catalyst is potassium carbonate.

5. A method in accordance with claim 1, where the aromatic bis(ether anhydride) is 4,4'-bis(3,4-dicarboxyboxyphenoxy)phenyl]propane dianhydride.

6. A method in accordance with claim 1, where the aromatic bis(ether anhydride) is 2,2-bis[4-(2,3-dicarboxyphenoxy)phenyl]propane dianhydride.

7. A method in accordance with claim 1, where the aromatic bis(ether anhydride) is 4,4'-bis(3,4-dicarboxyphenoxy)diphenyl sulfide dianhydride.

8. A method in accordance with claim 1, where the organic diisocyanate is diphenyl methane-4,4'-diisocyanate.

9. A method in accordance with claim 1, where the organic diisocyanate is a mixture of 2,4- and 2,6-toluene diisocyanate.

10. A method in accordance with claim 1, where the catalyst is rubidium carbonate.

References Cited

UNITED STATES PATENTS

| | | | |
|---|---|---|---|
| 3,699,075 | 10/1972 | Lubowitz | 260—49 |
| 3,489,696 | 1/1970 | Miller | 260—2.5 |
| 3,300,420 | 1/1967 | Frey | 260—2.5 |
| 3,314,923 | 4/1967 | Muller et al. | 260—78 |

FOREIGN PATENTS

| | | | |
|---|---|---|---|
| 224,056 | 6/1968 | U.S.S.R. | 260—47 CP |
| 257,010 | 7/1970 | U.S.S.R. | 260—47 CP |

LESTER L. LEE, Primary Examiner

U.S. Cl. X.R.

260—49, 77.5 R